United States Patent Office 3,358,206
Patented Dec. 12, 1967

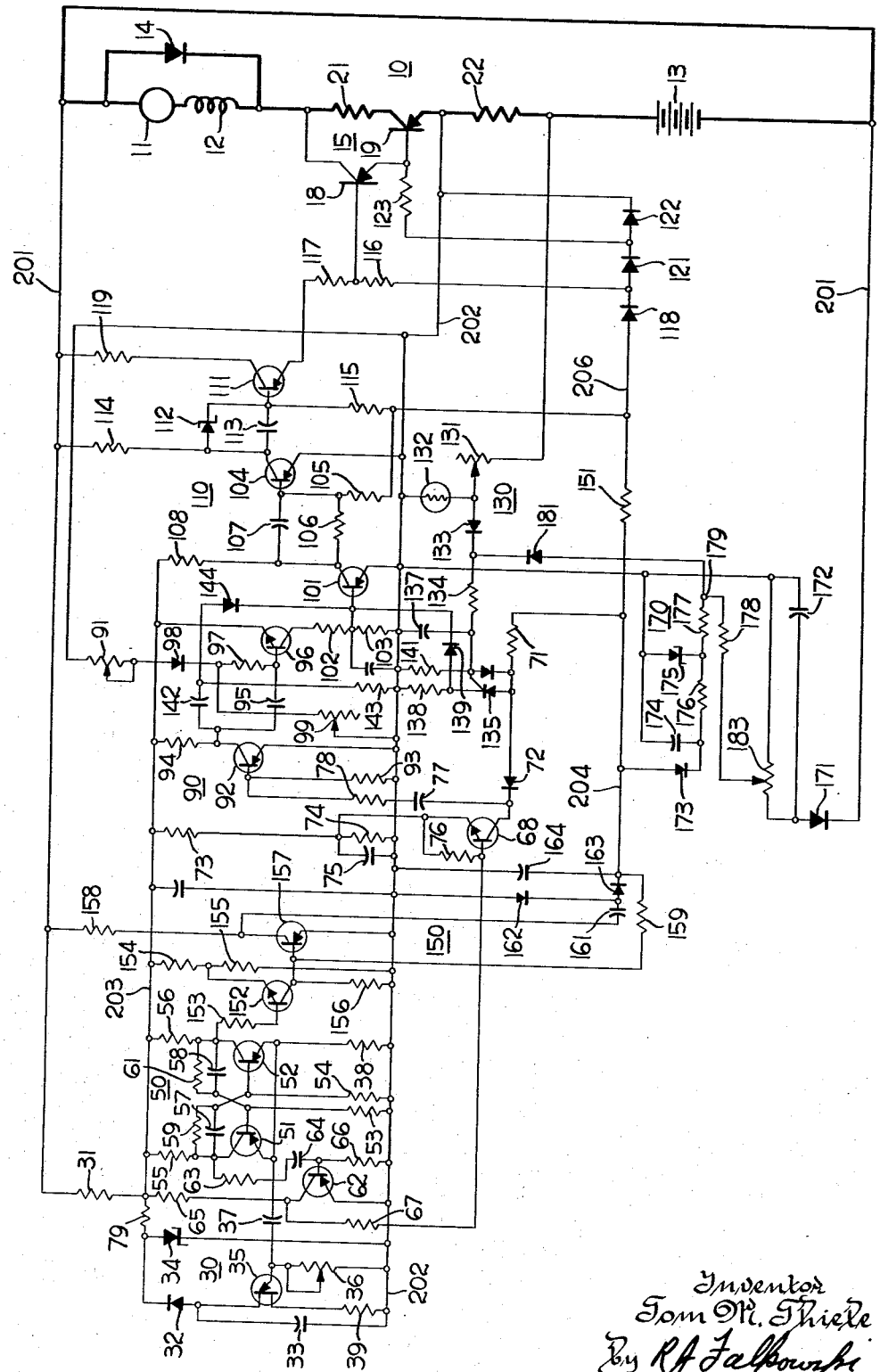

3,358,206
PULSE WIDTH MODULATION CONTROL SYSTEMS FOR CONTROLLING DIRECT CURRENT MOTORS
Tom N. Thiele, Chicago Heights, Ill., assignor to Allis-Chalmers Manufacturing Company, Milwaukee, Wis.
Filed June 1, 1965, Ser. No. 460,598
13 Claims. (Cl. 318—341)

ABSTRACT OF THE DISCLOSURE

A circuit for cyclically turning on a power transistor connected between a direct current source and a vehicle motor to control the operation of the vehicle includes an oscillator, a bistable multivibrator coupled to the oscillator, and pulse timing means coupled to the output of multivibrator for controlling the power transistor and including a potentiometer which operates as the accelerator for the vehicle and a capacitance which is charged upon receipt of a pulse from the multivibrator and discharges through the potentiometer to a predetermined potential to turn on the power transistor at a portion of the cycle dependent upon the potentiometer setting to thus control the pulse width and the effective power delivered to the motor. The circuit also includes voltage multiplying means coupled to the multivibrator for providing a reference voltage and a potential greater than that of the power source to reverse bias the power transistors, undervoltage limiting means for turning off the power transistor and decreasing the pulse width if the voltage potential falls below the reference voltage, and current limiting means for decreasing the width of the pulse when the current through the power transistor exceeds a preselected level.

---

This invention relates to systems for controlling direct current motors, particularly to systems that utilize pulse width modulation circuits to control the effective electrical energy delivered to a direct current motor.

One of the common ways to control the operation of a direct current motor from a power source such as a battery or a fuel cell is to connect a resistance in series with the motor and the power source. Control of the effective voltage delivered to the motor is accomplished by varying the resistance. This, however, wastes power through the resistor at less than maximum output. Therefore, systems have been devised that use a pulse producing circuit to turn a switch off and on at rapid cyclic intervals to vary the total effective voltage applied to the direct current motor.

This invention relates to a system that utilizes a pulse width modulation control system for turning an electronic power switch off and on to cyclically connect a direct current motor to a direct current power source. The intervals of the on and off condition of the switch are varied to control the effective power delivered to the motor.

This invention essentially comprises a direct current motor powered by a direct current power source and a control system that rapidly and cyclically turns a semiconductor switch off and on to vary the effective electrical power to the motor. Means are provided to produce a potential greater than that of the power source for reverse biasing of the semiconductor power switch and for furnishing a reference voltage for an undervoltage limiting circuit. The system also includes a current limiting circuit. The current limiting circuit and the undervoltage limiting circuit operate automatically to reduce the electrical energy delivered to the motor in response to an increase of instantaneous current in the power circuit to an undesirable level or in response to a drop in instantaneous battery voltage below a desired level.

The objects of this invention are to provide a new and improved motor control system; to provide a new and improved pulse width modulation control system for direct current motors; to provide a pulse width modulation control system for direct current motors that includes undervoltage limiting means that directly compares a measure of the battery voltage to a selected reference voltage; to provide a pulse width modulation control system for a direct current motor utilizing a semiconductor power switch in the power circuit; to provide a pulse width modulation system for a direct current motor including means for reverse biasing the semiconductor power switch when it is in a nonconducting condition; to provide an improved pulse width modulation system that includes current limiting and undervoltage limiting circuits for controlling a direct current motor; and a pulse width modulation control and direct current motor system utilizing a free-wheeling diode in the motor circuit and a combination of motor time constant and pulse width modulation operating frequency to provide an average motor current that may exceed the average power source current at less than full turn on/or duty cycle operation.

Other objects and advantages will be apparent from the following detailed description of an embodiment of this invention.

The figure is a schematic drawing of a motor and pulse width modulation control system embodying this invention.

Referring to the figure, a power circuit 10 has a direct current motor 11 with a field winding 12 connected to a direct current source such as a battery 13. A free-wheeling diode 14 is connected across motor 11 and winding 12 to provide a current discharge path for induced currents when the power circuit is opened.

A power switch 15 is connected in power circuit 10 and is shown to comprise a power transistor 18 and a power transistor 19. In many applications the power requirements are large enough so that several power switches would be connected parallel to power switch 15. By paralleling the power switches any power requirements can be handled.

Transistor 19 is connected to turn on in response to an input and thereby close the power circuit. A balance resistor 21, of very small resistance, is connected to provide maximum forward bias for power transistor 19. A shunt resistor 22, also of very small resistance, is connected to provide a source for measuring current through power circuit 10.

Referring to the control system for controlling power switch 15, means are provided for producing a cyclic timing signal. In the embodiment shown, this means is shown as a unijunction transistor oscillating circuit 30. The output of oscillating circuit 30 is responded to by a bistable multivibrator or flip-flop circuit 50 that produces a square wave output having a half cycle period equal to the period of the pulses from oscillating circuit 30. The output signal of multivibrator circuit 50 is received as an input by two different circuits.

A voltage multiplying circuit 150 receives the multivibrator output and produces a potential greater than the potential available from battery 13. This potential is used to provide a reference voltage for an undervoltage limiting circuit 170 and to provide back bias potential for various transistors in the system and particularly for transistors 18 and 19 in power switch 15.

A pulse timing circuit 90 also receives the multivibrator output and produces a pulsing output having a pulse length controlled by the adjustment of a rheostat 91. This pulsing output is utilized to control the on and off time of power switch 15.

The pulsing output from timing circuit 90 is amplified and inverted by a pulse amplifying circuit 110 that provides sufficient current for operation of power switch 15.

A current limiting circuit 130 is provided to decrease the pulse width and thereby the on time of power switch 15 when the instantaneous current through power circuit 10 exceeds a predetermined level.

Undervoltage limiting circuit 170 is provided to decrease the pulse width and thereby the on time of power switch 15 when the instantaneous voltage of battery 13 drops below a predetermined level.

Referring to the figure in the operation of the control system, battery 13 has a common negative conductor 201 connected to its negative terminal and a common positive conductor 202 connected to its positive terminal for providing potential for operation of the circuits. Common positive conductor 202 is connected to the positive terminal of battery 13 through the very small shunt resistance of shunt resistor 22.

Oscillating circuit 30 is connected to common negative conductor 201 through a voltage dropping resistor 31 that provides operating potential for the circuits at a negative conductor 203. Oscillating circuit 30 comprises a diode 32 and a capacitor 33 for decoupling purposes. A zener diode 34 and a resistor 79 are connected to provide a more stable lower voltage. A unijunction transistor 35 has its emitter connected to positive conductor 202 through a rheostat 36 and also through a capacitor 37 and an output resistor 38. A current limiting resistor 39 is connected in the base circuit of unijunction transistor 35. Oscillating circuit 30 operates upon application of proper potential between conductors 201 and 202 and current immediately flows primarily from conductor 202 through output resistor 38, capacitor 37, the emitter-base circuit of transistor 35, diode 32, resistor 79, and resistor 31 to negative terminal 201. During this initial flow of current unijunction transistor 35 is conducting because the emitter of unijunction transistor 35 is sufficiently positive relative to its upper base (as shown in the drawing). As capacitor 37 charges, the emitter of transistor 35 becomes less positive and transistor 35 turns off. This occurs almost immediately upon the application of a potential across the circuit to produce a sharp pulse across output resistor 38. When transistor 35 turns off, capacitor 37 discharges slowly through output resistor 38 and rheostat 36 until the emitter of transistor 35 becomes sufficiently positive to again turn on transistor 35.

Oscillating circuit 30 produces the sharp periodic pulse across output resistor 38 at intervals selected by the adjustment of rheostat 36. The periodic pulse is applied as an input to bistable circuit 50. Bistable circuit 50 is a conventional flip-flop circuit that switches from one state to another upon the receipt of a negative input pulse. Circuit 50 comprises a transistor 51, a transistor 52, stabilizing resistors 53 and 54, collector resistors 55 and 56, capacitors 57 and 58, and resistors 59 and 61.

In the operation of bistable circuit 50, one transistor is on while the other is off. Upon the receipt of the negative input pulse, the transistor that is on tends to be turned off and this tends to turn on the other transistor. The increased conduction of the other transistor increases the tendency to turn off the on transistor. Referring specifically to circuit 50, assuming that transistor 52 is on and that a negative pulse appears at the emitters of transistors 51 and 52, the emitter of transistor 52 then negatively changes in potential relative to its base and begins to turn off. As transistor 52 begins to turn off its collector tends to become more negative across resistor 38 and the increased resistance of its emitter-collector circuit. This tends to make the base of transistor 51 negative through resistor 61 and, at the instant of change, through capacitor 58. This tends to turn transistor 51 on and as the conductance of transistor 51 increases its collector tends to become more positive across resistor 38 and the increased conductance of its emitter-collector circuit. This tends to make the base of transistor 52 more positive through resistor 59 and, at the instant of change, through capacitor 57 and thereby turn off transistor 52. The change of condition occurs very rapidly in response to the input pulses and produces square wave outputs of equal magnitude and opposite polarity at the collectors of transistors 51 and 52. The signals appearing at the collectors of transistors 51 and 52 are the same but are 180° out of phase relative to each other.

The collector of transistor 51 produces an input for pulse timing circuit 90. The output of transistor 51 is delivered to a transistor 62 that has its emitter connected to common positive conductor 202 and its collector connected through a collector resistor 65 to negative conductor 203. The output of bistable circuit 50 appears across a resistor 66 and is delivered through a differentiating circuit comprising a resistor 63 and a capacitor 64 to turn on transistor 62 during the beginning of the negative square wave portion of the output at the collector of transistor 51.

When transistor 62 is turned on, its collector is connected to positive conductor 202 and current flows through a base resistor 67 to the base of transistor 68. This current makes the base of transistor 68 positive relative to its emitter and transistor 68 turns on. With transistor 68 turned on, current flows from a positive conductor 204 that has a potential more positive than the positive terminal of battery 13 through a resistor 71, a diode 72, the emitter-collector of transistor 68, and a resistor 73 to negative conductor 203. A resistor 74 and a capacitor 75 provide filtering to prevent excessive voltage fluctuations. A resistor 76 is connected between the emitter and base of transistor 68 to provide a leakage current path to keep transistor 68 completely turned off when no positive input is supplied to its base through resistor 67.

When transistor 68 turns on, its collector becomes negative relative to common positive conductor 202 and current flows across a differentiating circuit made up of a capacitor 77 and a resistor 78 to produce a negative pulse at the base of a transistor 92. This negative pulse appears across a resistor 93 connected between the base of transistor 92 and common positive conductor 202. This negative pulse is of short duration and momentarily turns on transistor 92 and current flows through the emitter-collector circuit of transistor 92 from common positive conductor 202 through a resistor 94 to negative conductor 203.

When transistor 92 turns on, a capacitor 95 becomes charged. Capacitor 95 instantaneously charges from common positive conductor 202, through the emitter-collector circuit of transistor 92, and through the base-emitter circuit of a transistor 96 to negative conductor 203. When transistor 92 turns off in response to the decay of the differentiated pulse from transistor 68, the positively charged plate of capacitor 95 (connected to the collector of transistor 92) is connected to negative conductor 203 through resistor 94. This makes the negatively charged plate of capacitor 95 more negative than negative conductor 203. This makes the base of transistor 96 negative relative to its emitter and transistor 96 is sharply turned off.

With transistor 96 turned off, capacitor 95 begins discharging from its negatively charged plate through a resistor 97, a diode 98, rheostat 91, common positive conductor 202, shunt resistor 22, battery 13, common negative conductor 201, resistor 31, positive conductor 203, and resistor 94 to its positively charged plate. A portion of the discharge current from capacitor 95 flows through a rheostat 99 connected in parallel with rheostat 91. Rheostat 99 is adjustable to trim rheostat 91.

When capacitor 95 has discharged to a sufficiently low voltage, transistor 96 turns on. Transistor 96 will turn on only if transistor 92 does not again turn on in response to the turning on of transistor 68 to recharge capacitor 95. The rate of discharge and, therefore, the time of turning on of transistor 96 is primarily controlled by the resistance of rheostat 91. Rheostat 91, therefore, may function as an accelerator in most vehicles. If rheostat 91 is set to a very low resistance, capacitor 95 rapidly discharges and transistor 96 is turned on almost immediately after the rapid turn-on and turn-off of transistor 92. This condition, with a low resistance setting on rheostat 91, is the high speed or high power output condition of power circuit 10. That is, power switch 15 is closed most of the cycle in response to the conduction of transistor 96.

The turning on of transistor 96 turns on a transistor 101 by connecting a voltage divider formed by a resistor 102 and a resistor 103 to negative conductor 203 through the emitter-collector circuit of transistor 96 to make the base of transistor 101 negative relative to its emitter across resistor 103. When transistor 101 turns on, the base of a transistor 104 becomes positive across a resistor 105 and through a resistor 106 and transistor 104 is turned off. A capacitor 107 is connected in parallel with resistor 106 to decrease the response time of transistor 104. A resistor 108 is connected in the emitter-collector circuit of transistor 101 to furnish negative voltage for application to the base of transistor 104.

When transistor 104 is turned on, a positive potential is applied to the base of a transistor 111 that operates to control power switch 15 to turn it off. When transistor 104 is turned on, the base of transistor 111 is connected across a resistor 115, that is part of a voltage divider made up of a resistor 114, zener diode 112, and resistor 115, to a positive conductor 206 connected to positive conductor 204 through a resistor 151. A zener diode 112 is connected between negative conductor 201 and the base of transistor 111 to keep the potential of the base of transistor 111 more positive than positive conductor 202 when transistor 104 is turned on. Without the zener diode the base of transistor 111 would be clamped to positive conductor 202 when transistor 104 is turned on. A capacitor 113 is connected to decrease the response time of transistor 111. The more positive voltage of positive conductor 206 is applied to the base of transistor 111 when it is turned off to insure complete turn-off to reduce leakage current.

When transistor 104 turns off, the base of transistor 111 becomes negative relative to its emitter and the three stage modified direct Darlington type circuit, made up of transistors 111, 18 and 19, turns on as current flows from the positive terminal of battery 13 through shunt resistor 22, the emitter-base circuit of transistor 19, the emitter-base circuit of transistor 18, resistor 117, the emitter-base circuit and the emitter-collector circuit of transistor 111, zener diode 112 and resistor 114, and resistor 119 to common negative conductor 201 to the negative terminal of battery 13. Because of the relative high voltages of the battery, zener diode 112 operates well above its breakover voltage when transistors 111, 18 and 19 are turned on. When power transistors 18 and 19 are turned on, the collector of transistor 18 is made more negative across balancing resistor 21 and this assures maximum conductance of transistor 19.

To assure full turn-off of the power transistors, a back bias potential substantially more positive than the terminal of battery 13 is provided. This positive potential is applied across a diode voltage divider made up of diodes 118, 121 and 122. When transistor 111 is turned off, the positive potential appearing at conductor 206 is applied across diode 118 through resistor 115 to the base of transistor 111. Similarly, the voltage drops appearing across diodes 121 and 122 are applied through resistors 116 and 123 to reverse bias transistors 18 and 19, respectively. Therefore, transistors 111, 18 and 19 are reversed biased when they are turned off by a positive potential greater than that available from the battery 13 to assure a minimum leakage current.

Means are also provided for decreasing the width of the pulse that turns on power switch 15 when the current through power circuit 10 exceeds a selected limit. To accomplish current limit control, means are provided to turn off transistor 101 earlier than the normal turn-off time of transistor 96 that occurs at the beginning of each cycle as determined by the turning on of transistor 92. To accomplish this, shunt resistor 22 is connected to provide a voltage measure of the current in power circuit 10. This voltage appears across a rheostat 131 and a thermistor 132. The rheostat is adjusted to provide a selected proportional measure of the current through the power circuit and thermistor 132 provides temperature compensation for the temperature affected silicon controlled rectifier triggering voltage.

The voltage appearing at the tap of rheostat 131 is applied through a diode 133 and a resistor 134 to the gate of a silicon controlled rectifier 135 across resistor 141. A capacitor 137 acts in conjunction with resistor 134 to provide filtering of any noise and is discharged across resistor 141. The filtering action of capacitor 137 and resistor 134 is necessary to eliminate induced gating input to silicon controlled rectifier 135 at the start of each cycle.

When silicon controlled rectifier 135 conducts, the positive voltage at positive conductor 204 provides current through resistor 71 and silicon controlled rectifier 135. This current creates a voltage drop across a resistor 138. The voltage appearing on the positive side of resistor 138 permits current to flow through a diode 139 to the base of transistor 101. This current creates a positive potential at the base of transistor 101 across resistors 102 and 103 and transistor 101 is turned off. This turns off power switch 15 at a point prior to the turn-off that would occur from the operation of pulse timing circuit 90.

An undervoltage limiting signal is also provided to turn on silicon control rectifier 135 when the battery potential drops below a predetermined level. This is accomplished by undervoltage limiting circut 170. Undervoltage limiting circuit 170 is connected to the negative terminal of battery 13 along common negative conductor 201 through a diode 171. Diode 171 and a capacitor 172 provide a filtering circuit for eliminating noise. The filtered voltage appears across a large resistance such as a potentiometer 173 that is connected between common negative conductor 201 through diode 171 and common positive conductor 202. A voltage is selected by the positioning of the tap of potentiometer 173 so that the desired voltage comparison can be made to a selected reference voltage.

The positive voltage provided by voltage multiplying circuit 150 appears at positive conductor 204 and is applied to a reference voltage circuit that is comprised of a diode 173, a capacitor 174, a zener diode 175, and a resistor 176. Diode 173, capacitor 174, and resistor 176 are primarily used to provide filtering of the somewhat variable potential at positive conductor 204. The voltage appearing across zener diode 175 becomes the reference voltage. The voltage at the tap of potentiometer 183 and the reference voltage across zener diode 175 appear across bridge resistors 177 and 178 at a point 179. When the potential at the tap of potentiometer 183 is equal to or at a designed relation to the reference voltage, the potential at point 179 relative to common positive conductor 202 is zero. When the voltage of the battery is high, the potential at point 179 is negative and no current flows through a diode 181. However, when the battery voltage drops, the negative potential at the tap of potentiometer 183 drops and at the selected voltage the potential at point 179 becomes sufficiently positive to create current through diode 181 and resistor 134 to the gate of silicon controlled rectifier 135. This turns on silicon control rectifier 135 and turns off transistor 101 in the same manner as current limiting circuit 130 turns transistor 101 off to decrease the time of turning on of power switch 15.

Since a silicon controlled rectifier will remain on once it is triggered if its anode-cathode circuit is forwardly biased, means are provided to turn SCR 135 off at the beginning of each operating cycle as determined by the turnoff of transistor 51 and the momentary turning on of transistor 68. When transistor 68 turns on, the anode of SCR 135 is momentarily connected to negative conductor 203 through diode 72, the collector-emitter circuit of transistor 68, and resistor 73. If SCR 135 is conducting at the beginning of a cycle, this action will cause the anode of SCR 135 to momentarily become more negative than its cathode, turning it off. Therefore, at the commencement of each operating cycle the voltage and current limiting circuitry is "reset" so it can respond during the following cycle, if necessary.

Because current limiting circuit 130 and undervoltage limiting circuit 170 may turn off power switch 15 prior to the turn-off time determined by pulse timing circuit 90, it is desirable that a blanking pulse be applied to transistor 101 when transistor 92 turns on momentarily to charge capacitor 95 and momentarily turns on transistor 96. Transistor 96 momentarily turns on and off then turns on again after capacitor 95 discharges to a certain level. Since this could result in a pulse of short duration that would momentarily turn on transistor 101, and therefore power switch 15, if one of the limiting circuits operate, it is desirable to keep transistor 101 turned off during this brief interval.

To accomplish this a capacitor 142 is connected to be charged as capacitor 95 is charged upon the turning off of transistor 92. Capacitor 142 charges when transistor 92 is turned off by connecting negative conductor 203 to one side of the capacitor through resistor 94 and connecting the other side to common positive conductor 202 through a resistor 143. While transistor 92 is off, the left side of capacitor 142 charges negatively and the right side charges positively. At the point that transistor 92 turns on to charge capacitor 95, capacitor 142 discharges through a diode 144 to the base of transistor 101 and keeps it turned off. The current path for discharge of capacitor 142 from its positively charged terminal is through diode 144, resistor 103 along positive conductor 202, and through the emitter-collector circuit of transistor 92.

Voltage multiplying means 150 provides a voltage more positive than the positive terminal of battery 13. This is particularly desirable for back biasing power transistors 18 and 19 and certain other transistors in the circuit to limit leakage current through the transistors when they are turned off. Circuit 150 comprises a transistor 152 that is responsive to the condition of the collector of transistor 52 an flip-flop circuit 50. When transistor 52 is turned off, its collector is negative and transistor 152 is turned off. When transistor 52 is turned on, current flows from common positive conductor 202 through resistor 38, the emitter-collector circuit of transistor 152, and a resistor 153 to the base of transistor 152. This makes the base of transistor 152 positive relative to its emitter to turn on transistor 152. Current then flows from the base of transistor 152 through a resistor 154 to negative conductor 203. A resistor 155 is connected to provide a voltage divider with resistor 154 for biasing the emitter of transistor 152.

When transistor 152 turns on, its collector is connected at a point in a voltage divider made up of a resistor 156 and resistor 154 connected between negative conductor 203 and positive conductor 202. This point is then negative relative to the emitter of transistor 157, and transistor 157 turns on. When transistor 157 turns on, current flows fom positive conductor 202 through the emitter-collector circuit of transistor 152 and a collector resistor 158 to common negative conductor 201. A resistor 159 is connected to provide positive reverse bias for transistor 157.

During the portion of the cycle that transistor 157 is turned off, a capacitor 161 charges. The left side of capacitor 161, as shown in the figure, charges negatively and the right side positively. With transistor 157 turned off, the left side of capacitor 161 is connected to negative conductor 201 through resistor 158 and the right side of capacitor 161 is connected to positive conductor 202 through a diode 162. Capacitor 161 charges to the level of the potential between negative conductor 201 and positive conductor 202.

When transistor 157 turns on, the negatively charged left side of capacitor 161 is connected to positive conductor 202 and the positively charged right side of capacitor 161 is connected through a diode 163 to a capacitor 164 that has its other plate connected to positive conductor 202. Capacitor 161 then discharges into capacitor 164. The charging current flows from the left side of capacitor 161 through the collector-emitter circuit of transistor 157 and common positive conductor 202 to the upper plate of capacitor 164, and from the right side of capacitor 161 through diode 162 to the lower plate of capacitor 164. The cyclic charge and discharging of capacitor 161 charges capacitor 164 so that its lower plate becomes positive relative to common positive conductor 202. The level of the charge on capacitor 164 is limited by the load circuit across capacitor 164 but does reach a voltage (at positive conductor 204) substantially higher than the voltage of positive conductor 202. A voltage of several times the source voltage may be obtained by substituting an appropriately sized choke coil for resistor 158.

The potential at conductor 204 is utilized for undervoltage limiting circuit 170, for the control of transistor 68, and by dropping it across a resistor 151, for the reverse biasing of transistors 111, 18 and 19 across diodes 118, 121 and 122, respectively.

Thus, oscillating circuit 30 provides timed pulsing output for controlling flip-flop circuit 50. The output of flip-flop circuit 50 is applied to voltage multiplying circuit 150 to provide a voltage more positive than the postive terminal at the battery, and the output of flip-flop circuit 50 is also applied to pulse timing circuit 90 to start its operating cycle in response to the change in condition of flip-flop circuit 50. Pulse timing circuit 90 produces an output after an interval from the start in its operating cycle that is determined by the setting of rheostat 91 that controls the rate of discharge of capacitor 95. As the discharge time becomes faster, the on-time of transistor 96, and correspondingly the ion-time of power switch 15, becomes greater for each cycle.

Blanking is provided by capacitor 142 to control transistor 101 to keep it turned off during the initial turn-on of transistor 92 at the start of each cycle. A current limiting circuit 130 and an undervoltage limiting circuit 170 are provided to turn off transistor 101 a a point before the turn-off of transistor 96 if the current in power circuit 10 exceeds a selected level or the voltage of battery 13 drops below a predetermined level during the on pulse.

In describing the invention, the preferred embodiment has been shown and described, but it is obvious to one skilled in the art that there are many variations, combinations, alterations and modifications that may be made without departing from the spirit of the invention, or from the scope of the appended claims.

The embodiments of the invention in which an exclusive property or privilege is claimed are defined as follows:

1. A direct current electrical power system having a direct current source, a direct current motor connected to be energized by the source, a semiconductor connected as a power switch between the source and the motor for connecting the source to the motor at predetermined cyclic intervals of controlled duration, and a pulse width modulation control system for controlling the semiconductor power switch comprising:

timing means for producing a cyclic timing signal of a predetermined constant period:

control means responsive to the timing signal to turn on the power switch for a selectable portion of each cyclic period;

voltage multiplying means connected to the source and responsive to the timing signal current source for producing a reference voltage greater than the voltage of the source; and means for applying the reference voltage to reverse bias the semiconductor power switch transistor during the portion of the cyclic period that the power switch is turned off.

2. A direct current electrical power system having a direct current source, a direct current motor connected to be energized by the source, a semiconductor connected as a power switch between the source and the motor for connecting the source to the motor at predetermined cyclic intervals of controlled duration, and a pulse width modulation control system for controlling the semiconductor power switch comprising:

timing means for producing a cyclic timing signal of a predetermined constant period;
control means responsive to the timing signal for turning on the semiconductor power switch for a selectable portion of each cyclic period;
voltage multiplying means connected to the source and responsive to the timing signal for producing a reference voltage greater than the voltage of the source; and
undervoltage limiting means responsive to the battery voltage and the reference voltage for controlling the control means to decrease the predetermined portion of each cyclic period as a function of the relationship between the reference voltage and the instantaneous battery voltage when the instantaneous battery voltage drops below a predetermined level.

3. A direct current electrical power system for a motor vehicle having a direct current source, a direct current motor connected to be energized by the source, a power transistor connected as a switch between the source and the motor for connecting the source to the motor at predetermined cyclic intervals of controlled duration, and a pulse width modulation control system for controlling the power transistor comprising:

timing means for producing a cyclic timing signal of a predetermined constant period;
control means responsive to the timing signal for turning on the power transistor for a selectable portion of each cyclic period;
voltage multiplying means connected to the source and responsive to the timing signal for producing a reference voltage greater than the voltage of the source;
undervoltage limiting means responsive to the battery voltage and the reference voltage for controlling the control means to decrease the predetermined portion of each cyclic period as a function of the relationship between the reference voltage and the instantaneous battery voltage when the instantaneous battery voltage drops below a predetermined level; and
reverse biasing means for applying the reference voltage to reverse bias the power transistor switch during the portion of the cyclic period that the power transistor switch is turned off.

4. A direct current electrical power system for a motor vehicle having a direct current source, a direct current motor connected to be energized by the source, a power transistor connected as a switch between the source and the motor for connecting the source to the motor at predetermined cyclic intervals of controlled duration, and a pulse width modulation control system for controlling the power transistor comprising:

timing means for producing a cyclic timing signal of a predetermined constant period;
control means responsive to the timing signal for turning on the power transistor for a predetermined portion of each cyclic period, said control means comprising a controllable resistance for varying said predetermined portion;
voltage multiplying means connected to the source and responsive to the timing signal for producing a reference voltage greater than the voltage of the source; and
undervoltage limiting means responsive to a measure of the battery voltage and to a controlled portion of the reference voltage for controlling the control means to decrease the predetermined portion of each cyclic period when the instantaneous measure of the battery voltage drops below the controlled portion of the reference voltage;
reverse biasing means for applying the reference voltage to reverse bias the power transistor during the portion of the cyclic period that the power transistor is turned off.

5. A direct current electrical power system having a direct current source, a direct current motor connected to be energized by the source, a power transistor connected as a switch between the source and the motor for connecting the source to the motor at predetermined cyclic intervals of controlled duration, and a pulse width modulation control system for controlling the power transistor comprising:

timing means for producing a cyclic timing signal of a predetermined constant period;
a bistable multivibrator circuit responsive to each period of the timing signal to change from one stable state to the other;
control means responsive to the change of state of the multivibrator circuit to turn on the transistor switch for a selectable portion of each cyclic period;
voltage multiplying means responsive to the change of state of the multivibrator circuit and to the direct current source for producing a reference voltage greater than the voltage of the direct current source; and
means for applying the reference voltage to reverse bias the power transistor during the portion of the cyclic period that the power transistor is turned off.

6. A direct current electrical power system having a direct current source, a direct current motor connected to be energized by the source, a power transistor connected as a switch between the source and the motor for connecting the source to the motor at predetermined cyclic intervals of, controlled duration, and a pulse width modulation control system for controlling the power transistor comprising:

timing means for producing a cyclic timing signal of a predetermined constant period;
a bistable multivibrator circuit responsive to each period of the timing signal to change from one stable state to the other;
control means responsive to a change of state of the multivibrator circuit to turn on the transistor switch for a predetermined portion of each cyclic period, said means comprising a controllable resistance for varying said predetermined portion;
voltage multiplying means responsive to the change of state of the multivibrator circuit and to the direct current source for producing a reference voltage greater than the voltage of the direct source; and
means for applying the reference voltage to reverse bias the power transistor during the portion of the cyclic period that the power transistor is turned off.

7. A direct current electrical power system having a direct current source, a direct current motor connected to be energized by the source, a semiconductor connected as a power switch between the source and the motor for connecting the source to the motor at predetermined cyclic intervals of controlled duration, and a pulse width modulation control system for controlling the semiconductor power switch comprising:

means for producing periodic output pulses;
means responsive to each output pulse to turn off the semiconductor power switch, said means comprising a controllable resistance and a capacitance with said capacitance connected to receive a charge at the instant of the occurrence of an output pulse and connected to discharge through the controllable resistance after the occurrence of an output pulse, and said means also comprising means responsive to the discharge of the capacitor to a predetermined voltage to turn on the semiconductor power switch;

voltage multiplying means responsive to the source for for producing a reference voltage greater than the voltage of the direct current source; and means for applying the reference voltage to reverse bias the semiconductor power switch during the portion of the cyclic period that the semiconductor power switch is turned off.

8. A direct current electrical power system having a direct current source, a direct current motor connected to be energized by the source, and a power transistor connected as a switch between the source and the motor for connecting the source to the motor at predetermined cyclic intervals of controlled duration, and a pulse width modulation control system for controlling the power transistor comprising:

means for producing periodic output pulses;

control means responsive to each output pulse to turn off the power transistor, said means comprising a controllable resistance and a capacitance with said capacitance connected to receive a charge at the instant of the occurrence of an output pulse and connected to discharge through the controllable resistance after the occurrence of an output pulse, and said means also comprising means responsive to the discharge of the capacitor to a predetermined voltage to turn on the power transistor;

voltage multiplying means responsive to the source for producing a reference voltage greater than the voltage of the direct current source; and undervoltage limiting means responsive to the battery voltage and the reference voltage for controlling the control means to decrease the predetermined portion of each cyclic period as a function of the relationship between the reference voltage and the instantaneous battery voltage when the instantaneous battery voltage drops below a predetermined level.

9. A direct current electrical power system having a direct current source, a direct current motor connected to be energized by the source, a power transistor connected as a switch between the source and the motor for connecting the source to the motor at predetermined cyclic intervals of controlled duration, and a pulse width modulation control system for controlling the power transistor comprising:

means for producing periodic output pulses;

means responsive to each output pulse to turn off the power transistor, said means comprising a controllable resistance and a capacitance with said capacitance connected to receive a charge at the instant of the occurrence of an output pulse and connected to discharge through the controllable resistance after the occurrence of an output pulse, and said means also comprising means responsive to the discharge of the capacitor to a predetermined voltage to turn on the power transistor;

voltage multiplying means responsive to the source for producing a reference voltage greater than the voltage of the direct current source; and, means for applying the reference voltage to reverse bias the power transistor during the portion of the cyclic period that the power transistor is turned off.

10. A direct current electrical power system having a direct current source with a positive terminal and a negative terminal, a direct current motor connected to be energized by the source, a transistor connected as a power switch between the source and the motor for connecting the source to the motor at predetermined cyclic intervals of controlled duration, and a pulse width modulation control system for controlling the transistor power switch comprising:

timing means for producing a cyclic timing signal of a predetermined period;

control means responsive to the timing signal for turning on the power switch transistor for a predetermined portion of each cyclic period;

means for producing a reference voltage greater than the voltage of the direct current source comprising a first and second capacitor, a first and second diode, and a switching transistor having two output electrodes with said first capacitor having a first plate connected to the negative terminal of the source and a second plate connected to the cathode of said first diode and the anode of said second diode, said anode of said first diode connected to the positive terminal of said source, said second capacitor having a first plate connected to the cathode of said second diode and a second plate connected to said positive terminal, and said switching transistor connected to turn on and off periodically in response to the timing signal with one output electrode connected to said positive terminal and the other output electrode connected to said first plate of said first capacitor to furnish the reference voltage as a potential at said first plate of said second capacitor positive relative to said positive terminal; and means for applying the reference voltage to reverse bias the power switch transistor when the switch control switch means has the power switch transistor turned off.

11. A direct current electrical power system having a direct current source with a positive terminal and a negative terminal, a direct current motor connected to be energized by the source, a transistor connected as a power switch between the source and the motor for connecting the source to the motor at predetermined cyclic intervals of controlled duration, and a pulse width modulation control system for controlling the transistor power switch comprising:

timing means for producing a cyclic timing signal of a predetermined period;

means including a capacitor responsive to the timing signal to periodically, momentarily connect the source to the capacitor to charge said capacitor;

means for discharging said capacitor in a circuit comprising a controllable resistance for varying the time for discharge;

switch control means responsive to the momentary connecting of the source to the capacitor to turn off the power switch transistor and responsive to the discharge of the capacitor to a predetermined voltage to turn on the power switch transistor;

means for producing a reference voltage greater than the voltage of the direct current source comprising a first and second capacitor, a first and second diode, and a switching transistor having two output electrodes with said first capacitor having a first plate connected to the negative terminal of the source and a second plate connected to the cathode of said first diode and the anode of said second diode, said anode of said first diode connected to the positive terminal of said source, said second capacitor having a first plate connected to the cathode of said second diode and a second plate connected to said positive terminal, and said switching transistor connected to turn on and off periodically in response to the timing signal with one output electrode connected to said positive terminal and the other output electrode connected to said first plate of said first capacitor to furnish the reference voltage as a potential at said first plate of said second capacitor positive relative to said positive terminal; and means for applying the reference voltage to reverse bias the power switch transistor when the switch control switch means has the power switch transistor turned off.

12. A direct current electrical power system for a motor vehicle having a direct current source with a positive terminal and a negative terminal, a direct current motor connected to be energized by the source, a transistor connected as a power switch between the source and the motor for connecting the source to the motor at predetermined cyclic intervals of controlled duration, and a pulse width modulation control system for controlling the transistor power switch comprising:

oscillating means for producing cyclic output pulses at a predetermined period;

bistable multivibrator means responsive to said output pulses to change from one state to the other state upon production of each of said output pulses;

means including a capacitor responsive to a change of state of the bistable circuit from one state to another to momentarily connect the source to the capacitor to charge said capacitor;

means for discharging said capacitor in a circuit comprising a controllable resistance for varying the time for discharge;

switch control means responsive to the momentary connecting of the source to the capacitor to turn off the power switch transistor and responsive to the discharge of the capacitor to a predetermined voltage to turn on the power switch transistor;

means for producing a reference voltage greater than the voltage of the direct current source comprising a first and second capacitor, a first and second diode, and a switching transistor having two output electrodes with said first capacitor having a first plate connected to the negative terminal of the source and a second plate connected to the cathode of said first diode and the anode of said second diode, said anode of said first diode connected to the positive terminal of said source, said second capacitor having a first plate connected to the cathode of said second diode and a second plate connected to said positive terminal, and said switching transistor connected to turn on and off with the change of state of the bistable circuit with one output electrode connected to said positive terminal and the other output electrode connected to said first plate of said first capacitor to furnish the reference voltage as a potential at said first plate of said second capacitor positive relative to said positive terminal; and means for applying the reference voltage to reverse bias the power switch transistor when the switch control switch means has the power switch transistor turned off.

13. A direct current electrical power system for a motor vehicle having a direct current source with a positive terminal and a negative terminal, a direct current motor connected to be energized by the source, a transistor connected as a power switch between the source and the motor for connecting the source to the motor at predetermined cyclic intervals of controlled duration, and a pulse width modulation control system for controlling the transistor power switch comprising:

oscillating means for producing cyclic output pulses at a predetermined period;

bistable multivibrator means responsive to said output pulses to change from one state to the other state upon production of each of said output pulses;

means including a capacitor responsive to a change of state of the bistable circuit from one state to another to momentarily connect the source to the capacitor ot charge said capacitor;

means for discharging said capacitor in a circuit comprising a controllable resistance for varying the time for discharge;

switch control means responsive to the momentary connecting of the source to the capacitor to turn off the power switch transistor and responsive to the discharge of the capacitor to a predetermined voltage to turn on the power switch transistor;

means for producing a reference voltage greater than the voltage of the direct current source comprising a first and second capacitor, a first and second diode, and a switching transistor having two output electrodes with said first capacitor having a first plate connected to the negative terminal of the source and a second plate connected to the cathode of said first diode and the anode of said second diode, said anode of said first diode connected to the positive terminal of said source, said second capacitor having a first plate connected to the cathode of said second diode and a second plate connected to said positive terminal, and said switching transistor connected to turn on and off with the change of state of the bistable circuit with one output electrode connected to said positive terminal and the other output electrode connected to said first plate of said first capacitor to furnish the reference voltage as a potential at said first plate of said second capacitor positive relative to said positive terminal;

means for applying the reference voltage to reverse bias the power switch transistor when the switch control switch means has the power switch transistor turned off;

means for deriving a measure of the battery voltage and for comparing said measure to a controlled voltage derived from the reference voltage to produce an indicating voltage having a zero potential at a preselected relation between said means and said controlled voltage; and means responsive to an instantaneous indicating voltage of a polarity indicating an instantaneous relatively low battery voltage to turn off the power switch transistor before the discharge of the capacitor.

References Cited

UNITED STATES PATENTS

| | | | |
|---|---|---|---|
| 3,191,113 | 6/1965 | Gargani | 318—341 X |
| 3,214,666 | 10/1965 | Clerc | 318—341 X |
| 3,239,742 | 3/1966 | Mierendorf et al. | 318—341 X |

ORIS L. RADER, *Primary Examiner.*

J. J. BAKER, *Assistant Examiner.*